Feb. 26, 1935.  G. D. HOUSTON  1,992,427
CORN PLANTER
Filed Sept. 22, 1932
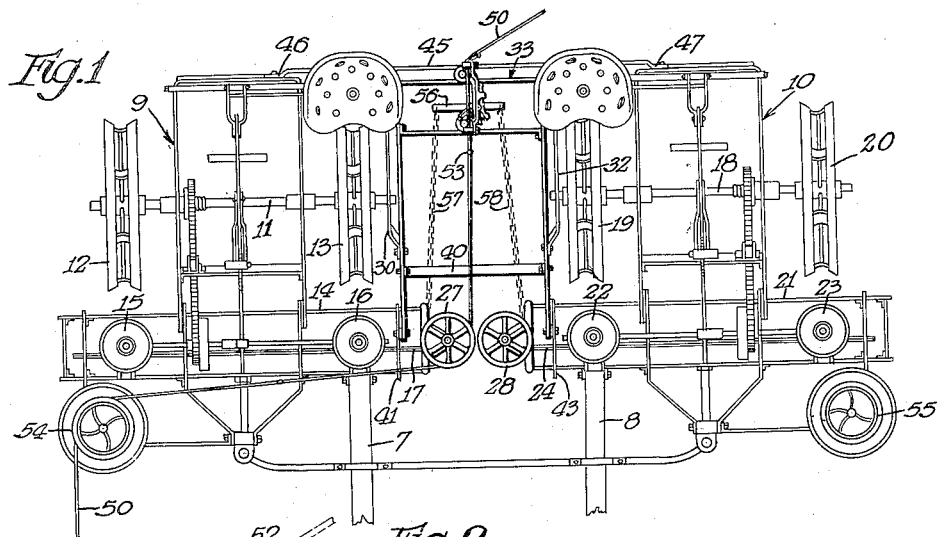
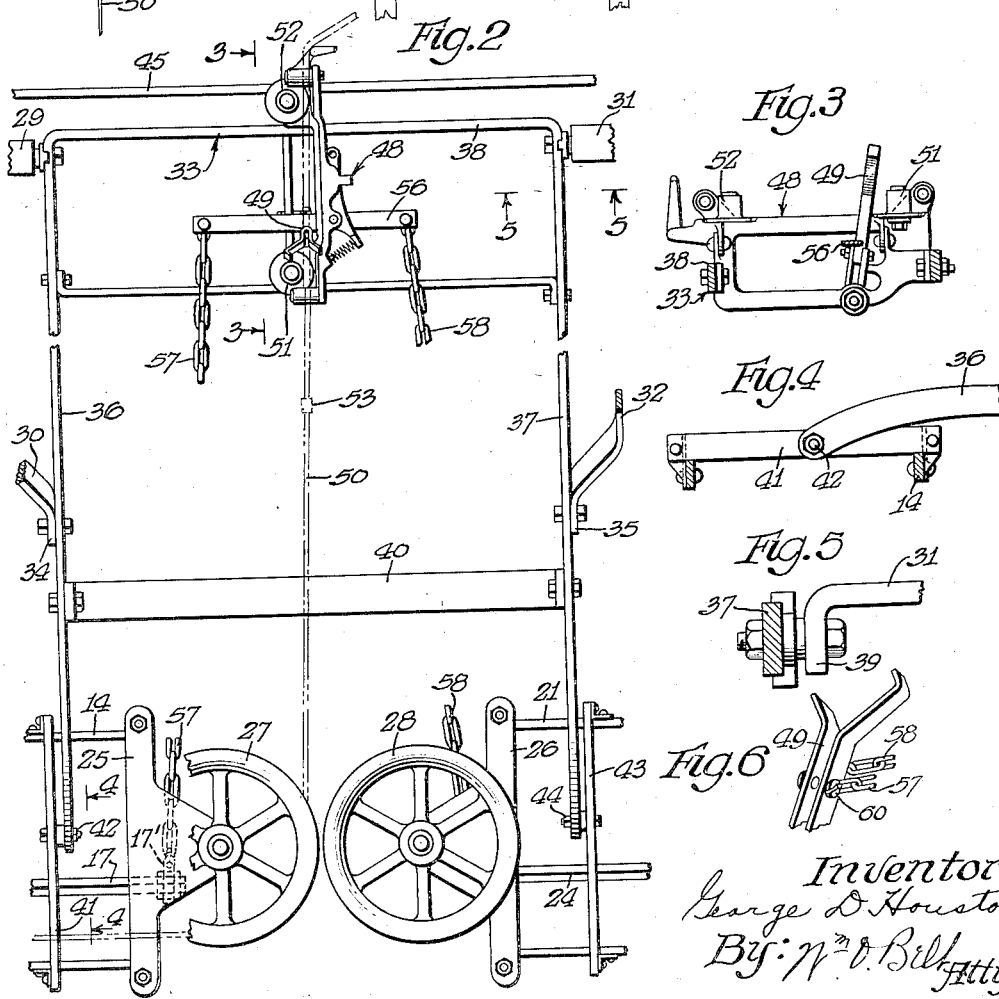
Inventor:
George D. Houston
By: Wm. O. Bell, Atty.

Patented Feb. 26, 1935

1,992,427

UNITED STATES PATENT OFFICE 1,992,427

CORN PLANTER

George D. Houston, Rushville, Ill.

Application September 22, 1932, Serial No. 634,280

7 Claims. (Cl. 111—38)

This invention relates to corn planters and more particularly to a multiple row planter and has for its primary object to so operate the dropping devices that planting of the seeds in alignment is assured.

The invention has particular reference to check row corn planters and another object of the invention is to provide a novel four row planter through which the check wire is guided in such a manner that a back and forth traverse of the field may be accomplished by restaking the wire in the same manner as it is done for a two row planter.

Further objects of the invention are to provide a control which may be used in connection with corn planters of commercial construction; to provide for so interconnecting the planter parts that alignment of the parts is assured; and to provide a control of simple and economical construction and efficient and positive operation.

Selected embodiments of the invention are illustrated in the accompanying drawing wherein Fig. 1 is a plan view of a corn planter embodying my invention;

Fig. 2 is a plan view of my novel frame and control;

Fig. 3 is a detail view taken substantially on the line 3—3 on Fig. 2;

Fig. 4 is a detail view taken substantially on the line 4—4 on Fig. 2;

Fig. 5 is a detail view taken substantially on the line 5—5 on Fig. 2; and

Fig. 6 is a perspective detail view of a modified form of construction.

In the accompanying drawing showing a preferred form of construction for my invention, I show a horse-drawn planter having tongues 7 and 8 respectively connected to the forward ends of frames 9 and 10. The frame 9 is mounted on an axle 11 carried by wheels 12 and 13. An auxiliary frame 14 at the forward end of the frame 9 has hoppers 15 and 16 mounted thereon which are spaced apart in the customary amount. Planter boots are mounted below the hoppers 15 and 16 in a manner well understood in the art and have valves therein controlled from the valve operating rod 17 in the usual way. The frame 10 is mounted on an axle 18 carried by wheels 19 and 20. An auxiliary frame 21 is mounted at the forward end of the frame 10 and carries hoppers 22 and 23 which likewise have the usual planter boots arranged therebelow that include valves controlled from the valve operating shaft 24.

The auxiliary frames 14 and 21 are aligned one with the other and the adjacent ends thereof are spaced apart. Brackets 25 and 26 are respectively mounted on the adjacent ends of the frames 14 and 21 and pulleys 27 and 28 are mounted on the brackets 25 and 26 and have the juxtaposed portions of the peripheries thereof slightly spaced apart.

A connecting member 29 is secured to the rear of the frame 9 and a connecting member 31 is secured to the rear of the frame 10. An intermediate frame 33 is provided and foot portions 39 (Fig. 5) on the connecting members 29 and 31 are attached at the juncture of the side members 36 and 37 with the rear member 38 of the intermediate frame 33. A brace 41 extends between opposite rails of the frame 14 and the forward end of the side member 36 is pivotally connected thereto as at 42 (Fig. 4). A brace 43 extends between the rails of the frame 21 and the forward end of the side member 37 is pivotally connected thereto as at 44. Thus the intermediate frame 33 interconnects the frames 9 and 10 and, to insure rigidity, a rear brace 45 is provided which has the ends thereof respectively connected to the frames 9 and 10 as at 46 and 47. The intermediate frame 33 is reenforced by a cross brace 40 which extends between the side members 36 and 37. Seats are provided above the frames 9 and 10. A seat supporting member 30 includes a foot portion 34 which is secured to the side frame member 36. A seat supporting member 32 includes a foot portion 35 which is connected to the side frame member 37. In this way seats may be mounted on the seat supporting members rearwardly of the adjacent wheels for the frames and, if desired, other braces may be provided to reenforce the seats.

It is essential that the valve operating rods 17 and 24 be so operated that seeds are simultaneously delivered from the planter boots so that the seeds will be planted in alignment. If a check head is provided at one side of the planter and an interconnecting link is provided between the rods 17 and 24, the slightest wear in the interconnection will cause one of the rods to operate out of timed relation with the other. Therefore, I provide a check head on the intermediate frame 33 and then by interconnecting both the rods 17 and 24 to this check head, simultaneous operation of these rods is assured. Such a check head is indicated by 48 in the accompanying drawing and includes a forked lever 49 through which the check wire 50 is directed. The check head 48 includes the customary sets of guide rollers 51 and 52, past which the check wire 50 is directed, and which are arranged on opposite sides of the forked lever 49. At spaced intervals on the check wire 50 operating buttons 53 are secured, these buttons being spaced apart correspondingly to the desired spacing of the rows of seeds.

A guide pulley 54 is mounted forwardly of and adjacent the outer end of the frame 14 and a similar guide pulley 55 is mounted forwardly of and adjacent the outer end of the frame 21. When the planter is traveling in one direction across the field, the check wire 50 is directed about the guide pulley 54 and the pulley 27 past the guide roller 51 through the fork on the lever 49 past the guide rollers 52 and as the buttons successively engage the fork in the lever 49, the lever is pivoted rearwardly and as the planter continues to move forwardly the buttons move from engagement with the forked lever 49 which returns to the position shown in Fig. 3. The rearward pivoting of the lever 49 is utilized to cause simultaneous operation of the valve operating rods 17 and 24. To this end an evener 56 is connected to the lever 49. One end of a chain 57 is connected to one end of the evener 56 and the other end of this chain is connected to an arm 17' on the rod 17. One end of a chain 58 is connected to the other end of the evener and the other end of this chain is connected to an arm on the valve operating rod 24, which arm is not shown but which corresponds to the arm 17'. The evener 56 assures that uniform movement is transmitted through the chains 57 and 58 to the valve operating rods 17 and 24 and in this way simultaneous operation of the valves controlling the seed dropping is assured.

Preferably the check wire 50 is so staked that when the planter starts to move across the field in the direction opposite that in which it has been traveling, the check wire is led into the machine from the side opposite to that in which it has been directed; that is to say, if the planter has been traveling in one direction and the check wire 50 has been directed around the pulley 54, the check wire is directed around the pulleys 55 and 28 when the planter moves in the opposite direction and this, as is well understood in the art, expedites the operation of the planter.

When the planter is used in the planting of corn, the hills of corn are customarily spaced about three and one-half feet apart. Hence, the buttons 53 on the check wire 50 are spaced three and one-half feet apart and the hoppers on the frames are also similarly spaced. Furthermore, the frame 33 is of sufficient width to so space the frames connected thereto that the hoppers 16 and 22 are spaced about three and one-half feet apart. Of course, if the planter is to be used other than in the planting of corn or if other spacing is desired, the parts may be adjusted to accommodate the different spacing.

In Fig. 6 I have shown a slightly modified form of construction and herein the chains 57 and 58 are directly connected to the lever 49 as indicated at 60.

While I have illustrated and described a selected embodiment of my invention it is to be understood that this is capable of variation and modification and I therefore do not wish to be limited to the precise details set forth but desire to avail myself of such changes and alterations as fall within the spirit and scope of the following claims:

I claim:

1. In a planter, a pair of frames, planting means mounted on said frames in spaced relation, an operating member in each of said frames for operating said planting means, common operating means, an evener on said common operating means, and means connecting said evener to said operating members.

2. In a planter, a pair of frames, planting means mounted on said frames, an operating member for the planting means on each of said frames, an intermediate frame mounted between said pair of frames and interconnecting the same, operating means carried by said intermediate frame for actuating said operating members, balancing means on said operating means, means interconnecting said balancing means and said operating members, and guide pulleys mounted on said frames adjacent said intermediate frame and adapted to direct a check wire to said operating means whereby said operating means is actuated upon engagement of the check means on said check wire therewith, said balancing means uniformly distributing the operative movement of said operating means through the interconnecting means to the operating members to effect simultaneous operation of said operating members.

3. In a planter, a pair of frames, a guide pulley at the forward outer corner of each of said frames, planting means on said frames, an intermediate frame interconnecting said frames, operating means on said intermediate frame for operating said planting means, and other guide pulleys mounted on said frames adjacent said intermediate frame and about which a check wire may be respectively directed after being passed about one or the other of the first named guide pulleys whereby said check wire may be directed to said operating means to operate the same.

4. In a planter, a pair of frames, an intermediate frame interconnecting said frames, planting means mounted on said frames in spaced relation, an operating member in each of said frames for operating said planting means, common check wire operated operating means, an evener on said common operating means, means connecting said evener to said operating members, a guide pulley at the forward outer corner of each of said frames, and other guide pulleys mounted on said frames adjacent said intermediate frame and about which a check wire may be respectively directed to said common operating means after being passed about one or the other of the first named guide pulleys whereby said check wire may effect operation of said common operating means.

5. In a planter, a plurality of planting means mounted in alignment side by side and in spaced relation, independent operating means for said planting means, common means for operating said independent operating means and mounted intermediate two of the planting means, an evener on said common operating means, and means connecting the evener to said independent operating means.

6. In a planter, a pair of frames mounted in alignment side by side, a plurality of planting means mounted on said frames in alignment and uniformly spaced one from the other, independent means on said frames for operating said planting means, operating means including a member mounted between said frames and engageable with a check wire to be operated by the check wire upon movement of the planter relative to said check wire, flexible means for connecting said member to said independent means, and means connecting said flexible means to said member and transmitting movement imparted to said member upon movement of the planter relative to the check wire to said flexible means and said independent means to effect simultaneous operation of the planting means operated by said independent means.

7. In a planter, a pair of frames mounted in alignment side by side, a plurality of planting means mounted on said frames in alignment and uniformly spaced one from the other, independent means on said frames for operating said planting means, operating means including a member mounted between said frames and engageable with a check wire to be operated by the check wire upon movement of the planter relative to said check wire, an evener on said member, and means connecting said evener to said independent means whereby movement imparted to said member upon movement of the planter relative to the check wire is transmitted to said independent means to effect simultaneous operation of the planting means operated by said independent means.

GEORGE D. HOUSTON.